Sept. 21, 1971  P. R. DE RYCK  3,606,642
INJECTION MOLDING MACHINES
Filed July 1, 1969  3 Sheets-Sheet 1

INVENTOR
PETRUS ROBERT De RYCK

ATTORNEY

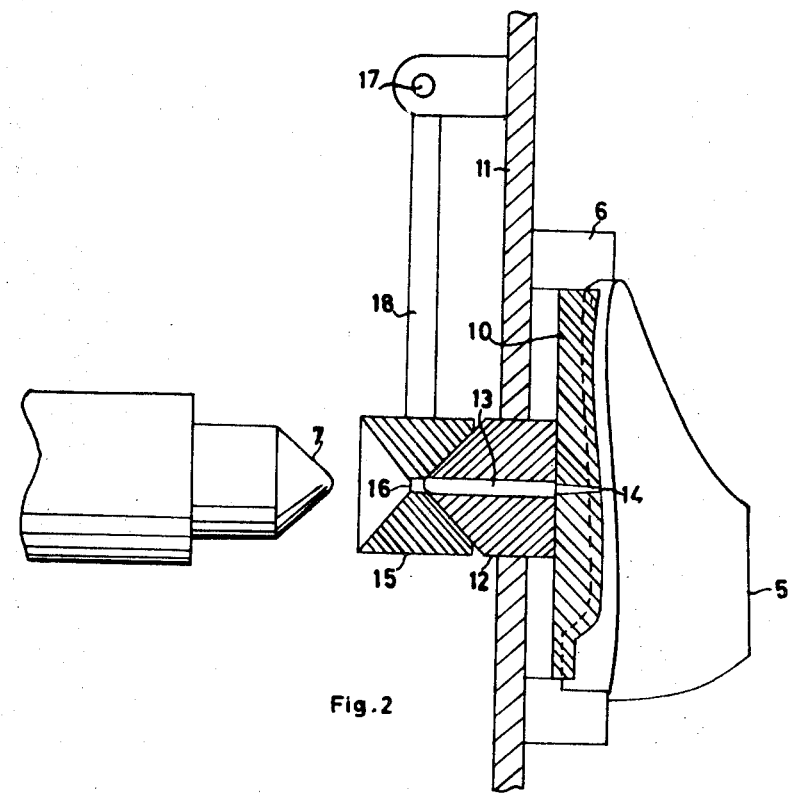
Fig. 2
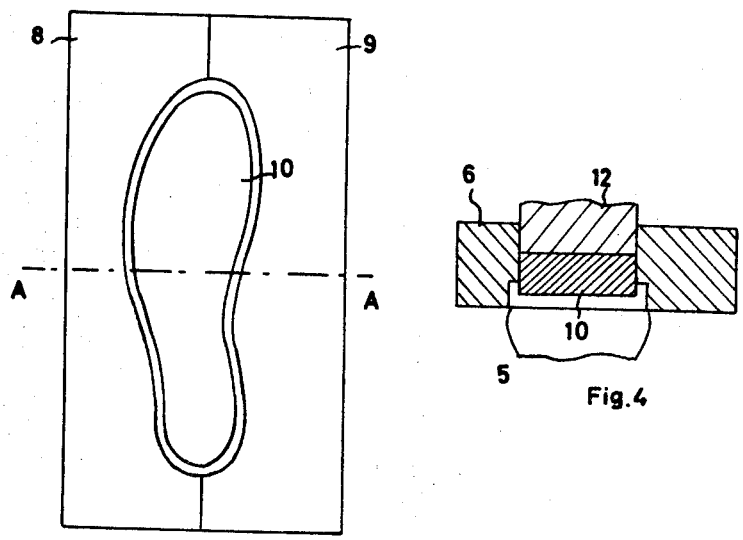
Fig. 3
Fig. 4

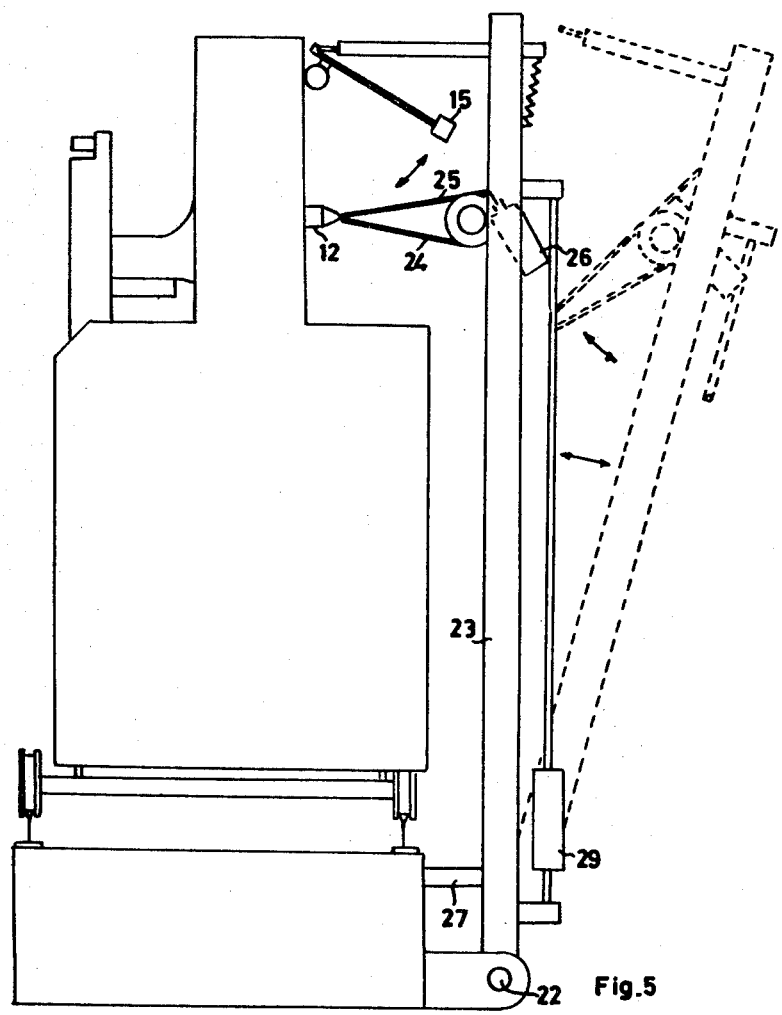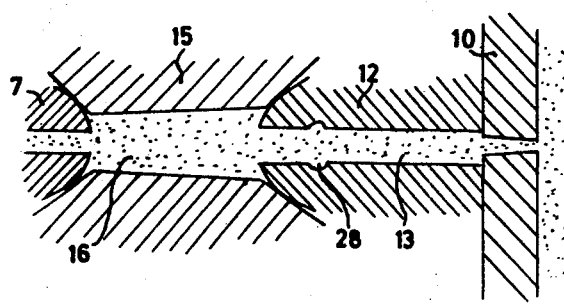

United States Patent Office 3,606,642
Patented Sept. 21, 1971

3,606,642
INJECTION MOLDING MACHINES
Petrus Robert De Ryck, Oordegem, Belgium, assignor to Daco Machinenfabriek N.V., Oordegem, Belgium
Filed July 1, 1969, Ser. No. 838,070
Claims priority, application Belgium, July 5, 1968, 717,645
Int. Cl. B29f 1/12
U.S. Cl. 18—30US                                6 Claims

ABSTRACT OF THE DISCLOSURE

An injection molding apparatus comprising, for each mold, a displaceable coupling member for connecting the injection head to the mold. The coupling member is provided with two opposite cavities which fit respectively onto the injection head and the conical extremity of the part containing the injection channel for the mold. The cavities are interconnected by a conical channel the opening of which is narrower on the injection head side. In this manner, after the coupling member has been displaced, the molding bead presents an outer extremity of a certain length which can be easily grabbed by a plier-like extractor device.

---

This invention relates to the manufacture of articles made of plastic or similar materials and, in particular, to the placing of soles on shoes. One machine for effecting the above operation is disclosed in U.S. Pat. No. 3,448,490 issued June 10, 1969; it comprises mobile carriages travelling on rails and carrying molds which are closed by lasts capped by shoes. The carriages are actuated in such a way that the molds pass successively in front of an injection head the mechanism of which is automatically put into operation.

In other known machines there are provided two or more injection heads and the molds are equipped with a displaceable punch for the purpose of manufacturing articles having two or more layers of different materials or of a same material having two or more different colors. Such a machine is described, for example, In U.S. Pat. No. 3,400,429 issued Sept. 10, 1968.

In the operation of these machines, and particularly of those for manufacturing articles having two or more superposed layers of material, difficulties and consequently losses of time are encountered in the removing of the molding beads, which remain in the injection channels after each injection operation.

It is, therefore, an object of the present invention to provide an injection molding apparatus, especially for the placing of soles on footwear in one or more layers, in which the extraction of molding beads from the injection channels is rapidly and safely performed.

In general, the injection molding apparatus of the present invention comprises, for each mold, a displaceable coupling member for connecting the injection head to the mold. The coupling member is provided with two opposite cavities which fit respectively onto the injection head and the conical extremity of the part containing the injection channel for the mold. The cavities are interconnected by a conical channel the opening of which is narrower on the injection head side. In this manner, after the coupling member has been concealed, the molding bead presents an outer extremity of a certain length which can be easily grabbed by a plier-like extractor device.

Other characteristics and advantages of the invention will appear in the following description and the attached drawings which relate to an embodiment of a machine in accordance with the invention. In the drawings:

FIG. 2 illustrates a mold formed by a forming block and positioned in front of an injection head;

FIG. 3 is a plan view of the mold;

FIG. 4 is a section view taken along line A—A of FIG. 3;

FIG. 5 illustrates the operation of an extracting device, and

FIG. 6 illustrates, on a larger scale, a section through the injection head.

Figure 1:
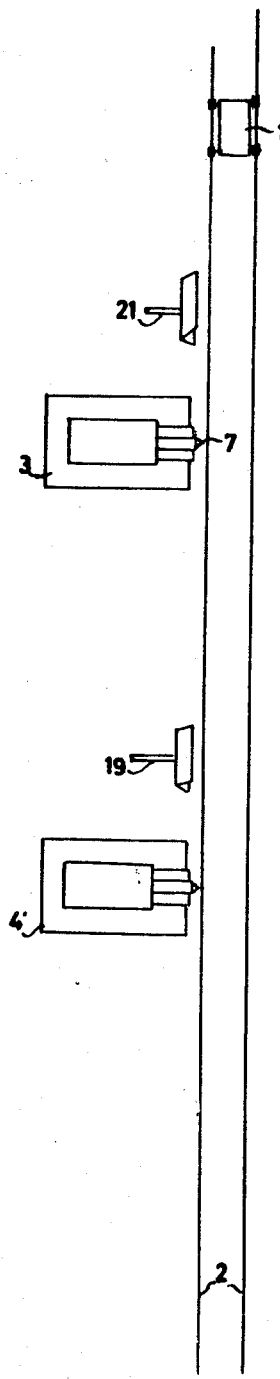
FIG. 1 illustrates schematically a machine equipped with carriages moving on rails.

In FIG. 1, there is illustrated schematically a machine equipped with carriages 1 moving on rails 2. The carriages are equipped with molds which cooperate with two injection devices 3 and 4 in a known fashion and which may take two different positions.

In FIG. 2 to 4, a mold 6 closed by a last 5 is located in front of an injection head 7 forming part of the injection device 3. The mold 6 is made of two halves 8 and 9 and of a punch 10, and is mounted on a frame 11 forming part of a carriage which is not illustrated.

The punch 10 of mold 6 is fixed on a mobile part 12 of the carriage, which part is provided with a cylindrical injection channel 13. The channel 13 opens into a conical channel 14 made in punch 10. The larger section of channel 14 is smaller than that of cylindrical channel 13 while its smaller extremity is located on the side of the space in the mold in which the material is injected. Because of this structure, the molding bead which remains attached to the molded sole presents, at its junction with the sole, a low resistance and may be easily removed with a tearing device which will be explained later on in the description.

The mobile part 12 has a conical extremity with a rounded end which fits a corresponding cavity in a coupling member 15. The coupling member 15 has, on its opposite side, a similar cavity in which may be adapted the injection head 7. Between the two cavities is located a conical channel 16 whose narrowest section is located on the injection head side. The coupling member 15 is supported by an arm 18 which may be rotated around an axis 17 so as to cause such member 15 to swing upwardly after injection and consequently to free the end of mobile part 12.

When mold 6 located on carriage 1 arrives in front of injection device 3, the injection head 7 is introduced in coupling member 15 and the molding material is injected.

When the injection operation is achieved, the carriage 1 is moved towards an extractor device 19 which comes into operation after the time necessary for cooling the mold has elapsed, which time is determined by a timing device, not shown. The function of the extractor device is to remove the molding bead as it will be explained hereinafter with reference to FIGS. 5 and 6.

When the bead has been removed, the carriage 1 is displaced towards a second injection device 4 and the punch 10 is moved back a distance such as to take the position illustrated in dash lines in FIG. 2 and the free space so formed is filled by a very rapid injection.

When the injection in the last mold of the last carriage is completed, the first carriage returns to its original position, and is consequently directed towards the extractor device 21 for removing the excess material.

The extractor device illustrated in FIG. 5 comprises an arm 23 which may be pivoted around an axis 22 under the action of an hydraulic cylinder 27. The arm 23 supports a plier-like device formed by two steel plates 24 and 25. At the end of arm 23 is located an adjustable mechanism whose function will be disclosed later. The plier-like device may be opened and closed by an hydraulic cylinder 26 and has a width corresponding to the number of molds in a carriage; such a plier-like device is movable upwardly and downwardly under the action of an hydraulic cylinder 29.

When a carriage stops in front of an extractor device, the plier-like device is oriented downwardly and the arm 23 is in the position illustrated in dash lines while the coupling member 15 is located adjacent to each injection head. The arm 23 advances under the action of hydraulic cylinder 27 and the adjustable mechanism bears against the arm supporting the coupling member 15 and cause such member to swing upwardly. The plier-like device is moved upwardly by hydraulic cylinder 29 and is opened by cylinder 26. The arm 23 is stopped and the plier-like device is closed by cylinder 26 to grab the material which protrudes from the injection part 12. The arm 23 returns backward under the action of cylinder 27 and the excess material is pulled and breaks at the location where it presents the weakest resistance. The arm 23 is stopped; the plier-like device is moved downwardly under the action of cylinder 29 and is opened by cylinder 26 which causes the bead of excess material to fall into a container.

In order to prevent the bead of excess material from being prematurely torn away because of its friction with or of its adhesion to the coupling member 15 when such coupling member is swung away before the coming into operation of the extractor device (which would cause such bead of excess material to remain with the coupling member 15 and render impossible the completion of the operation) the injection channel 13 is provided with an annular groove 28 such as illustrated in FIG. 6 which represents, on a larger scale, a partial section through the assembly of the injection head 7, the coupling member 15 the mobile part 12 and the punch 10. By this means, the bead of excess material is anchored in the channel 13 in such a way that the coupling member 15 may be swung away without problems.

The invention is not to be limited by the above described embodiment and, within the scope of the present application, a number of modifications may be made concerning the form, the composition, the disposition, and the number of parts used in carrying out the invention.

I claim:

1. In an injection molding machine for the manufacture of articles made of plastic or similar materials, especially for molding soles to lasted footwear, having molds disposed on carriages displaceable in front of one or more injection heads, each mold having a punch secured to a movable part having a conical extremity with a rounded end, and wherein the movable part has a cylindrical channel therein which opens into a conical channel located in the punch and communicating with the interior of the mold by its narrower end, the improvement comprising a displaceable coupling member for connecting the injection head to said movable part of each mold, said coupling member being provided with two opposite cavities which fit respectively onto the injection head and the conical extremity of said movable part, said cavities being interconnected by a conical channel the opening of which is narrower on the injection head side.

2. Injection molding machine according to claim 1, wherein said coupling member is rotatably mounted on an arm.

3. Injection molding machine according to claim 2, wherein extractor devices are provided along the path of travel of the molds for removing the excess molding material from the molded articles.

4. Injection molding machine according to claim 3, wherein each extractor device comprises a plier-like device the width of which corresponds to the number of molds in a carriage, such plier-like device being rotatably mounted on said extractor device.

5. Injection molding machine according to claim 4, wherein means are provided on said extractor device for pivoting said coupling member before putting into operation said extractor device.

6. Injection molding machine according to claim 1, wherein the cylindrical channel of said movable part which supports said punch has an annular groove therein.

References Cited
UNITED STATES PATENTS

| | | | |
|---|---|---|---|
| 3,350,748 | 11/1967 | McIlvin | 18—34(S) |
| 3,400,429 | 9/1968 | Ludwig | 18—30(US) |
| 3,448,490 | 6/1969 | De Ryck | 18—30(US)X |
| 3,055,056 | 9/1962 | Barton | 18—Dig. 51 |

J. SPENCER OVERHOLSER, Primary Examiner

N. E. LEHRER, Assistant Examiner

U.S. Cl. X.R.

18—Dig. 51